Oct. 28, 1924.  
D. MARTINEAU  
THIMBLE  
Filed Dec. 9, 1921  
1,512,943

Inventor  
Dominic Martineau,  
By Wm E Dye  
His Attorney

Patented Oct. 28, 1924.

1,512,943

UNITED STATES PATENT OFFICE.

DOMINIC MARTINEAU, OF JOHNSON CITY, TENNESSEE.

THIMBLE.

Application filed December 9, 1921. Serial No. 521,115.

*To all whom it may concern:*

Be it known that I, DOMINIC MARTINEAU, a citizen of the United States, residing at Johnson City, in the county of Washington and State of Tennessee, have invented certain new and useful Improvements in Thimbles; and I do hereby declare the following to be a full, clear, and exact description of the invention, such as will enable others skilled in the art to which it appertains to make and use the same.

My invention relates to thimbles, and more particularly stated contemplates the production of a combined thimble and knife blade, the latter being normally housed upon the outside of the thimble from which it is projected as occasions require.

An object of my present invention is to produce a thimble and associated cutting or ripping blade, said blade being slidably mounted and operatively controlled by a device which serves to both move and lock the blade in any desired position.

Another object of my invention is the production of a combined thimble and knife blade, the latter being slidably mounted in a casing or housing, and means including the movable controlling device of said blade and the aforesaid casing for locking the blade in the position desired.

With these and other objects in view the invention further consists in the production of a comparatively simple and inexpensively manufactured thimble and cutting blade, as will more fully hereinafter appear and be pointed out in the appended claim.

In the accompanying drawings illustrating an embodiment of my invention and wherein similar reference characters designate corresponding parts in the several views:—

Figure 1:
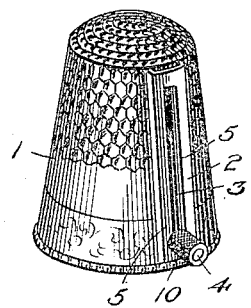
Figure 1 is a perspective view of my improved thimble, showing the cutting blade housed or sheathed.

My invention has been designed with a view to producing a simple and at the same time effective cutting or ripping attachment for thimbles. In the present disclosure, I have utilized the operating knob or handle which moves the cutting blade to also grip and secure the blade against the wall of the housing, thereby insuring a positive locking means for the blade in either retracted or extended position.

The thimble 1 may be of the usual construction, and of suitable size, and shape for the purpose desired. The sewing thimble illustrated in the drawing has attached to the outside thereof a casing or housing 2. This casing may be formed integral with the thimble, or it may be brazed, welded, soldered or otherwise attached thereto. As shown the casing or housing 2 is formed of relatively thin metal and is sufficiently wide to accommodate the cutting blade and permit of its sliding movement therein.

A slot or opening 3 is provided in the front wall of the housing 2 through which projects the threaded stem 4 of the operating knob or handle. Guide flanges or strips 5—5 are formed upon either side of the stem 4 by the slot 3, and it is against these flanges or guides that the knife is held in adjusted position. The upper end of the casing is open for the passage of the cutting blade. When in retracted position the portion connecting the guide flanges serves to sheath and protect the point of the blade.

The knife or cutting blade is formed with a shank 7 and cutting end 8, the edges of which latter come together to form a ripping point 9.

The threaded stem 4 is secured to the knife in any manner, an example being that shown herein where the end thereof is reduced and secured within an opening in the knife blade.

Figure 3:
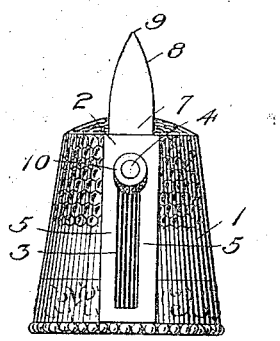
Figure 3 is a front view of the thimble showing in elevation the blade in extended position.

Threaded upon the stem 4 is a nut 10 forming the knob or handle of the knife and provided with an inner face or shoulder 11. This face or shoulder is arranged and adapted to bear against the outer face of the flanges or guides 5 and draw one side of the blade against the inner faces or walls of the aforesaid flanges or guides. In the position shown in Figure 4 the nut 10 is shown backed off of the threaded stem a little, space being shown between the shoulder of the nut and the guides 5. When in this position the cutting blade can be readily moved by grasping the nut forming the knob or handle. In Figure 3 the cutting blade is shown extended, and in locked position, it being obvious that when the desired position of the blade has been reached the nut 10 is screwed upon the stem 4 until the shoulder 11 bears firmly against the outer face of the guide 5, and the cutting blade bears firmly against the inner face of said guide.

Figure 2:
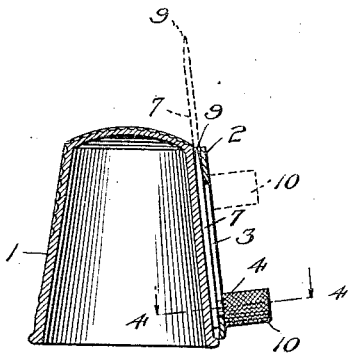
Figure 2 is a vertical sectional view through the thimble and casing or housing of the cutting blade, the latter being shown in full lines in retracted position, and extended in dotted lines.

Any intermediate position of the cutting blade may be obtained, or as shown in Figures 1 and 2 the nut 10 has beeen turned to lock the cutting blade in retracted or sheathed position. The stem 4 abutting against the lower end of the slot serves to limit the movement of the cutting blade when retracted. In some cases the knurled bead of the thimble may serve this purpose.

Figure 4:
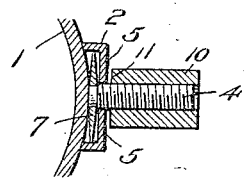
Figure 4 is an enlarged horizontal sectional view on the line 4—4 of Figure 2 with the controlling knob loosened on the threaded shank and the cutting blade in position to be moved.

The housing or casing 2 is preferably formed in channel or U-shape, as shown in Figure 4, for example, the bottom sides thereof abutting or resting upon the bead of the thimble. The stamping and bending of the housing to fit the curved thimble wall is comparatively simple and inexpensive.

From the foregoing it will be seen that I have produced an effective and at the same time particularly neat and compact article which embodies the known advantages of the thimble and at the same time adds other well known advantages incident to sewing.

Changes commensurate with the scope of my invention as particularly defined may be made, and I do not limit myself to the exact disclosures herein.

I claim:

A thimble formed with a housing having an open end and provided with a slot, said housing closing the ends of said slot and forming a guide flange at each side of the slot, a cutting blade slidably mounted in said housing and adapted to be projected through said open end or to be housed within the housing, a threaded stem permanently fixed to said blade and projecting through and beyond said slot, and a nut forming an operating handle for said blade threaded upon said stem and provided with a shoulder adapted to bear against the outer faces of the aforesaid guide flanges, said nut also serving to force the cutting blade against the inner faces of said guide flanges whereby the cutting blade may be locked in adjusted positions.

In testimony whereof I affix my signature, in presence of two subscribing witnesses.

DOMINIC MARTINEAU.

Witnesses:
R. A. LONG.
J. A. VINES,